May 2, 1933.   C. L. HAMM   1,906,463
MULTIPLE VOLTAGE CAPACITOR MOTOR
Filed Feb. 28, 1930
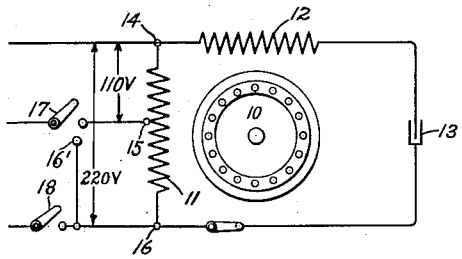
Fig. 1.
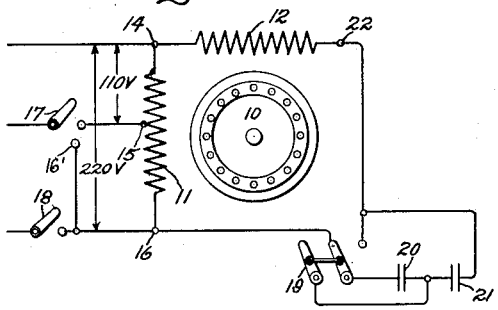
Fig. 2.
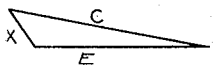
Fig. 4.
Fig. 5.   Fig. 3.
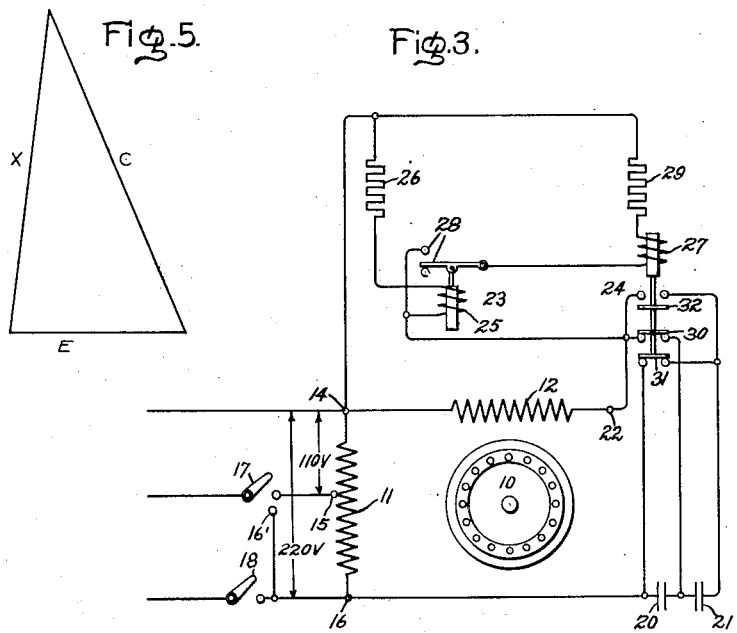
Inventor:
Clarence L. Hamm,
by Charles E. Mullen
His Attorney Patented May 2, 1933

1,906,463

UNITED STATES PATENT OFFICE

CLARENCE L. HAMM, OF PITTSFIELD, MASSACHUSETTS, ASSIGNOR TO GENERAL ELECTRIC COMPANY, A CORPORATION OF NEW YORK

MULTIPLE VOLTAGE CAPACITOR MOTOR

Application filed February 28, 1930. Serial No. 432,227.

My invention relates to improvements in the control of capacitor motors and in particular to multiple voltage capacitor motors whereby the same motor and capacitor combination may be employed on circuits of different voltages. Alternating current motors are often provided with facilities whereby the motor may be employed on circuits of different voltages. When condensers are employed with alternating current motors to obtain split phase starting or power factor correction, or both, it is not economical to provide as many different condensers or sets of condensers as there are line voltage connections nor is it economical to employ only part of the capacitance for one voltage connection and all the capacitance for another voltage connection. Where condensers are employed in connection with single phase motors for split phase starting and also used for power factor correction during running conditions it is usually desirable to make some change in the condenser connections between starting and running conditions either manually or automatically to effect a change in voltage impressed across the condenser. If such motors are also to be used on multiple voltage circuits the problem of keeping the control simple and at the same time utilizing the capacitance economically becomes still more important, especially so since the split phase condenser motor is generally confined to small sizes where cost of installation of condensers and control equipment is a considerable portion of the total cost.

With these considerations in mind I have provided simple and economical control connections generally applicable to multiple voltage capacitor motors whereby the condenser connections and control features are not disturbed when changing the motor connections for different voltages.

The features of my invention which are believed to be novel and patentable will be pointed out in the claims appended hereto. For a better understanding of the invention reference is made in the following description to the accompanying drawing in which Fig. 1 represents a simple embodiment of my invention as applied to a multiple voltage capacitor motor; Fig. 2 represents the invention where a change in capacitance is made between starting and running conditions; Fig. 3 represents a control scheme for accomplishing similar changes automatically; and Figs. 4 and 5 represent vector voltage relations in the starting winding circuit under starting and running conditions.

In Fig. 1, I have represented my invention as applied to a single phase capacitor motor where a condenser is employed to obtain split phase starting and power factor correction during running conditions without any change in the condenser connections between running and starting conditions or when the motor terminals are changed for connection to different voltage supply sources. 10 represents the secondary of the motor and is preferably the rotor member and may be of ordinary squirrel cage construction. 11 represents the main winding, and 12 the starting winding mounted on the stator and positioned to produce flux axes at an angle of approximately 90 electrical degrees to each other. The condenser 13 is permanently connected in series with the starting winding. The main winding and the starting winding have a common connection 14 for connection to one side of the source of supply. The main winding also has a tap at an intermediate point and a tap 16 at the other end for alternate connections to the 110 volt and 220 volt sources for example. The position of tap 15 will of course vary depending upon the voltage relation of the different sources of supply and as many such taps may be provided as there are different intermediate sources of supply. I have found that, assuming the voltages of the sources of supply are 110 and 220 volts respectively, the tap 15 should preferably be placed slightly closer to terminal 14 than to terminal 16 in order to have the same voltage across the capacitor for the different line connections. The condenser 13 is connected between winding 12 and tap 16 and consequently the starting winding circuit will always be subjected to the voltage existing between taps 14 and 16. When the motor is to be connected to the highest voltage the entire main winding will be used as such and line connections will be made across 14 and 16. Thus switch 18 will be closed and 17 open whereupon the assumed line voltage of 220 will be impressed upon the two motor circuits. If now the motor is to be used on a 110 volt circuit the line connections will be across terminals 14 and 15. Thus switch 17 will be closed and 18 open. Under these conditions the main winding in addition to its usual function acts also as an auto-transformer to impress 220 volts across the starting winding circuit. Thus it is seen that whatever the voltage of the available source of supply, the arrangement is such that the condenser is always subjected to the same voltage conditions and consequently may be designed for these conditions. Hence only one condenser unit is necessary and the usual simple motor terminal connections are employed for different supply voltages. The main winding is thus utilized as an adjustable auto-transformer for the starting winding circuit. The starting winding circuit may be opened after starting or may be left connected for power factor correction. In some motor installations it is desirable to obtain different speeds and advantage may be taken of the different voltage taps for this purpose. Thus if I connect the switch 17 to the connection 16' I will obtain a lower speed and output than when this switch is connected to tap 15.

In Fig. 2 the same type of motor is illustrated but arrangements are provided for changing the amount of capacitance in the starting winding circuit between starting and running conditions by means of a switch 19. In Fig. 2, as well as in Fig. 3, those parts which are similar to parts already described are represented by similar reference characters. Two condensers or sets of condensers 20 and 21 are provided in Fig. 2. At start these condensers are connected in parallel in the starting winding circuit and during running they are connected in series. The switch 19 is shown in the running connection and to connect the condensers in parallel it is swung to the right to the position where the right hand blade makes connection with the terminal leading to the starting winding at which time the blade which is now idle will connect to the terminal leading to 16. The condenser changing arrangement of Fig. 2 which is controlled automatically in Fig. 3 constitutes an important aspect of my invention since it is obvious that it may be used with motors adapted for single terminal voltage operation as well as those for multiple terminal voltage operation with certain advantages over the usual arrangement for accomplishing a change in capacitance between starting and running conditions. In this connection I have found that the voltage available across the capacitance during running conditions is approximately double that across the capacitance at start. Also that the voltage across the starting winding increases very materially between starting and running conditions. I take advantage of these facts both for the economical use of the capacitance and the automatic control thereof between starting and running conditions.

At first thought it might seem that since the terminal voltage across the starting winding and capacitance remains fixed the voltage across the capacitance and across the starting winding could not both increase between starting and running conditions. This apparent inconsistency is explained by the fact that at start the voltage induce in the starting winding from the main winding is negligible but at running speeds a considerable transformer action takes place between these windings through the rotor inducing a very considerable voltage in the starting winding. Figs. 4 and 5 show vector diagrams illustrating the average voltage relations of the starting winding circuit under starting and full speed conditions respectively. In these figures E represents the terminal voltage of this circuit as measured across points 14—16, X represents the voltage across the starting winding between points 14 and 22, and C represents the voltage across the capacitance between points 22 and 16.

In Fig. 3 the same results are accomplished automatically by relay switches 23 and 24, as by the manual control switch 19 of Fig. 2. The relay switches of Fig. 3 are shown in the positions for starting the motor. Relay 23 has a coil 25 permanently connected across the starting winding 12 through a resistance 26. At start and at low speeds the voltage on relay coil 25 is insufficient to operate the relay. However, as the voltage across the starting winding builds up with speed, relay 23 operates and energizes the coil 27 of switch relay 24 through contacts 28 and a resistance 29. Before coil 27 is energized the switch contacts controlled thereby are as represented, connecting condensers 20 and 21 in parallel and in series with the starting winding to point 16. At this time the circuit is established from the starting winding through the middle switch bar 30 to both condensers and from condenser 21 through the lower switch 31 to point 16, condenser 20 being permanently connected to point 16.

At approximately full speed, or at any speed desired, relays 23 and 24 operate interrupting the parallel connections of the condensers by opening switches 30 and 31 and establishing a series connection of the condensers in the starting winding circuit. The circuit thus established is from point 22 through the upper switch bar 32 of relay 24 to condenser 21 and 20 in series and then to point 16. If during normal operation the load should increase causing the speed to drop, the voltages on relay coils 25 and 27 wil be lowered causing such relays to drop out at a suitable speed point to reestablish the higher torque starting connection. It will be noted that both relays 23 and 24 are conected to be energized from the voltage across the starting winding. A single relay might be used if close control is unnecessary. It is preferable however to employ two relays because the small relay 23 can be made to have a closer operating range between its pick up and drop out voltages than relay 24 since the latter has much heavier switch parts to move. In mose cases advantage may also be taken of the change in current in the starting winding circuit instead of the change in voltage for operating the change over device. The more sensitive voltage responsive relay is however generally to be preferred. There are other automatic change over devices that might be used and I do not confine myself to any particular one.

Without confining the invention to any particular voltages for the sources of supply or for the condensers or to any particular selection between the voltages of the source of supply and condenser voltage one desirable combination will now be mentioned. I have found that with 220 volts across 14—16 the average volts at start across winding 12 is about 50, and that across the parallel connected condensers from point 22 to point 16 about 260. At normal speed the voltage across winding 12 is about 400 and that across the series connected condensers is about 440. It will thus be evident that individual condensers are subjected to approximately the same voltage under both conditions. Such condensers may therefore be most economically operated at approximately their rated voltage at all times. The considerable variation in voltage across the starting winding between starting and running conditions provides an excellent and reliable source of variable voltage for operating the control relays.

So far as the starting winding circuit is concerned the conditions are substantially the same both during starting and running, regardless of whether a line voltage of 110 volts is applied across the terminals 14—15, or whether 220 volts is applied across terminals 14—16. The current condition in the main winding 11 will be different for the different line voltages. For the 220 volt connection the same current will flow through the entire main winding. However, for the 110 volt connection, current will flow in opposite directions in the two portions of the winding on opposite sides of tap 15, that in portion 14—15 being sufficiently greater to overcome the effect of the starting winding current which flows in the opposite direction in portion 15—16. Consequently that portion of the main winding between 14—15 should be of larger wire than the remaining portion where a double voltage tap is employed.

Thus I have provided a new double voltage capacitor motor which employs the same capacitor unit for the different line voltages. I have also provided a very economical arrangement for changing the amount of capacitance in the starting winding circuit between starting and running conditions and a novel automatic change-over scheme for the above either or both of which may be employed without any change for one or more line voltage connections of the motor, as explained herein. Various different arrangements of starting winding circuits other than the ones herein described may be employed with the multiple voltage motor so long as the voltage impressed across the starting winding circuit for the different voltage line connections remains substantially the same.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. A single phase double voltage capacitor motor having a main winding and a starting winding, capacitance connected in series with the starting winding, and the circuit thus formed connected across the main winding, relay operated switching means for changing the effective value of the capacitance between starting and running conditions, said relay means being responsive to the voltage across the starting winding, and different line terminals on said main winding for alternately connecting said motor to different supply voltages, such that the voltages across the main winding, across the starting winding and relay means, and across the capacitance will be substantially the same for either line connection.

2. A single phase double voltage capacitor motor having a main winding and a starting winding, capacitance connected in the starting winding circuit, and the circuit thus formed connected in parallel with the main winding, said capacitance being divided into groups, and switching means for connecting the groups in parallel for starting the motor and in series during normal operation, relay means responsive to the voltage across the starting winding for automatically operating said switching means, and line terminals on said main winding for alternately connecting said motor to different supply voltages, such that the voltage across the main winding and across the starting winding circuit will remain substantially constant for either line connection, whereby the voltage which is impressed upon the capacitance and upon the relay means will be substantially the same, irrespective of which line connection is used.

In witness whereof, I have hereunto set my hand this 21st day of February, 1930.

CLARENCE L. HAMM.